United States Patent
Han et al.

(10) Patent No.: US 12,529,943 B2
(45) Date of Patent: Jan. 20, 2026

(54) PHOTOGRAPHING APPARATUS INCLUDING LENS MODULE CAPABLE OF EXTENDING AND RETRACTING RELATIVE TO HOUSING, AND ELECTRONIC DEVICE

(71) Applicant: VIVO MOBILE COMMUNICATION CO., LTD., Guangdong (CN)

(72) Inventors: Jianguo Han, Dongguan (CN); Xin Li, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 101 days.

(21) Appl. No.: 18/533,495

(22) Filed: Dec. 8, 2023

(65) Prior Publication Data

US 2024/0134251 A1 Apr. 25, 2024
US 2024/0231192 A9 Jul. 11, 2024

Related U.S. Application Data

(63) Continuation of application No. PCT/CN2022/097362, filed on Jun. 7, 2022.

(30) Foreign Application Priority Data

Jun. 11, 2021 (CN) .................. 202110655890.X

(51) Int. Cl.
G03B 17/04 (2021.01)
G03B 17/12 (2021.01)
G03B 30/00 (2021.01)

(52) U.S. Cl.
CPC ............. G03B 17/04 (2013.01); G03B 17/12 (2013.01); G03B 30/00 (2021.01)

(58) Field of Classification Search
CPC ........ G03B 17/04; G03B 17/12; G03B 30/00; G03B 11/043; G03B 2205/0007; G03B 3/10; G03B 5/00; G02B 7/022; G02B 13/001; G02B 7/023; G02B 27/646; G02B 7/021; G02B 7/08; H04N 23/57; H04N 23/51; H04N 23/54; H04N 23/55; H04N 23/50; H04N 23/52; H04N 23/675
See application file for complete search history.

(56) References Cited

U.S. PATENT DOCUMENTS

2005/0190283 A1* 9/2005 Ish-Shalom ............ H04N 23/55
348/340
2006/0159438 A1* 7/2006 Kobayashi ............. G03B 17/04
348/E5.025

(Continued)

FOREIGN PATENT DOCUMENTS

CN 207352245 U 5/2018
CN 207867109 U 9/2018

(Continued)

*Primary Examiner* — Abdelaaziz Tissire
(74) *Attorney, Agent, or Firm* — The Webb Law Firm

(57) ABSTRACT

A shooting apparatus includes a second housing movably disposed in a first housing and a lens module disposed in the second housing. The second housing and the first housing are provided with a first protrusion and a first spiral groove that fit each other. When a drive mechanism drives the second housing to move, the first protrusion is guidedly engaged with the first spiral groove, allowing the second housing to perform a lifting motion and the lens module to move with the second housing.

14 Claims, 3 Drawing Sheets

(56) References Cited

U.S. PATENT DOCUMENTS

| | | | | |
|---|---|---|---|---|
| 2008/0170306 A1* | 7/2008 | Shintani | ................ | H04N 23/55 |
| | | | | 396/529 |
| 2011/0001872 A1* | 1/2011 | Honsho | ................ | H04N 23/55 |
| | | | | 359/701 |
| 2011/0007202 A1* | 1/2011 | Chiang | ................ | G02B 7/102 |
| | | | | 348/E5.042 |
| 2011/0194194 A1* | 8/2011 | Terahara | ................ | G03B 17/12 |
| | | | | 359/823 |
| 2022/0146910 A1 | 5/2022 | Li et al. | | |
| 2023/0194960 A1* | 6/2023 | Yedid | ...................... | G03B 30/00 |
| 2023/0388614 A1* | 11/2023 | Park | ......................... | G02B 7/08 |

FOREIGN PATENT DOCUMENTS

| | | |
|---|---|---|
| CN | 112333351 A | 2/2021 |
| CN | 112526700 A | 3/2021 |
| CN | 112532840 A | 3/2021 |
| CN | 112637461 A | 4/2021 |
| CN | 112672568 A | 4/2021 |
| CN | 213305531 U | 5/2021 |
| CN | 113347342 A | 9/2021 |
| KR | 1020190040869 A | 4/2019 |
| WO | 2013114898 A1 | 8/2013 |

\* cited by examiner

PHOTOGRAPHING APPARATUS INCLUDING LENS MODULE CAPABLE OF EXTENDING AND RETRACTING RELATIVE TO HOUSING, AND ELECTRONIC DEVICE

CROSS-REFERENCE TO RELATED APPLICATIONS

This application is a Bypass Continuation Application of International Patent Application No. PCT/CN2022/097362 filed Jun. 7, 2022, and claims priority to Chinese Patent Application No. 202110655890.X filed Jun. 11, 2021, the disclosures of which are hereby incorporated by reference in their entireties.

BACKGROUND OF THE INVENTION

Field of the Invention

This application relates to the field of electronic devices, and in particular, to a shooting apparatus and an electronic device.

Description of Related Art

With the continuous development of terminal technology, people are paying increasing attention to the shooting function of electronic devices. Taking smartphones as an example, the shooting apparatus on smartphones has evolved from the initial fixed-focus single camera to zoom front and rear dual cameras, and then to the current two front-facing cameras and four rear-facing cameras.

However, as the shooting apparatus has been continuously optimized, to ensure shooting at different focus distances, it is necessary to mount multiple cameras with different focus distances for switching on the shooting apparatus. In this case, the camera with a long focus distance, which is too large, causes the shooting apparatus to occupy more space in the height direction.

In summary, usually, to ensure sufficient focus distance and zoom, the overall size of the shooting apparatuses cannot be further reduced, which in turn restricts the further miniaturization and lightweight development of electronic devices equipped with the shooting apparatuses.

SUMMARY OF THE INVENTION

An aspect of this application discloses a shooting apparatus, including a first housing, a second housing, a drive mechanism, and a lens module. The first housing is provided with a first accommodating hole, the second housing is movably disposed in the first accommodating hole, and the drive mechanism is drivingly connected to the second housing. The second housing is provided with a second accommodating hole, the lens module is disposed in the second accommodating hole. One of the first housing and the second housing is provided with a first spiral groove and the other of the first housing and the second housing is provided with a first protrusion. The first protrusion being guidedly engaged with the first spiral groove, and the first protrusion is slidable in the first spiral groove via the drive mechanism. The second housing is capable of performing a spiral lifting motion, at least a portion of the second housing is extendable out of or retractable into the first accommodating hole, and the lens module is movable with the second housing.

Another aspect of this application discloses an electronic device, including a shooting apparatus.

BRIEF DESCRIPTION OF THE DRAWINGS

The accompanying drawings described herein are intended for understanding of this application, and constitute a part of this application. Exemplary embodiments of this application and descriptions thereof are intended to interpret this application and do not constitute any improper limitation on this application. In the accompanying drawings.

Reference signs are described as follows:
- 100. first housing,
  - 110. first spiral groove, 120. first mounting component, 130. first loading or unloading space, 140. first accommodating hole,
- 200. second housing,
  - 210. first protrusion, 220. second spiral groove, 230. second loading or unloading space, 240. second accommodating hole, 250. avoidance notch,
- 300. drive mechanism,
- 400. transmission mechanism,
  - 410. gear shaft, 420. engaging teeth,
- 500. lens module,
  - 510. extending rod, 520. second protrusion, and 530. base.

DESCRIPTION OF THE INVENTION

To make the objectives, technical solutions, and advantages of this application clearer, the following clearly describes the technical solutions in the embodiments of this application with reference to the accompanying drawings in the embodiments of this application. Obviously, the described embodiments are merely some but not all of the embodiments of this application. All other embodiments obtained by persons of ordinary skill in the art based on the embodiments of this application shall fall within the protection scope of this application.

Figure 1:
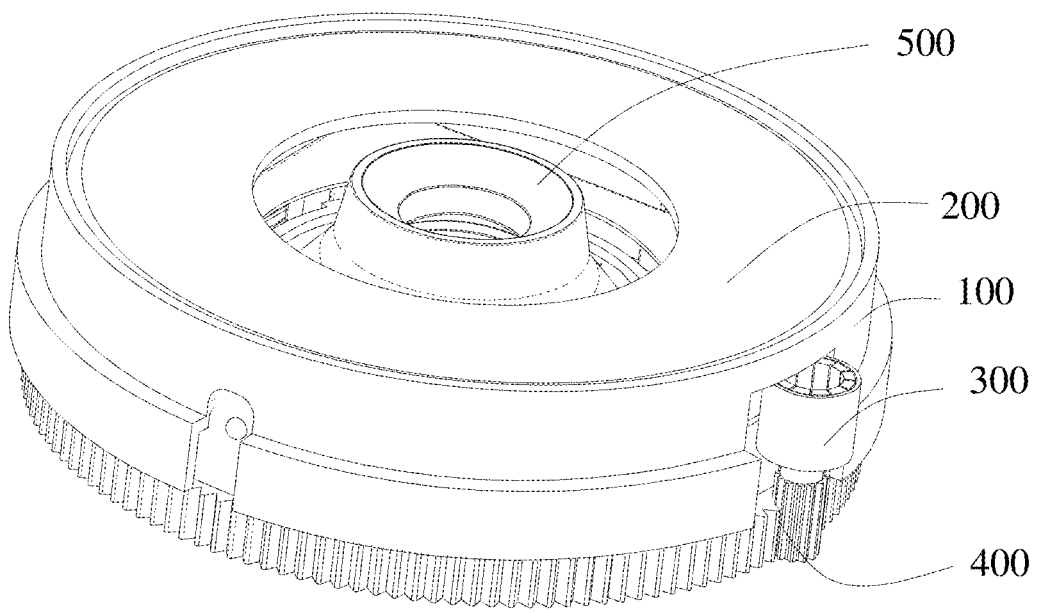
FIG. 1 is an overall structural diagram of a shooting apparatus according to an embodiment of the present application.
Figure 2:
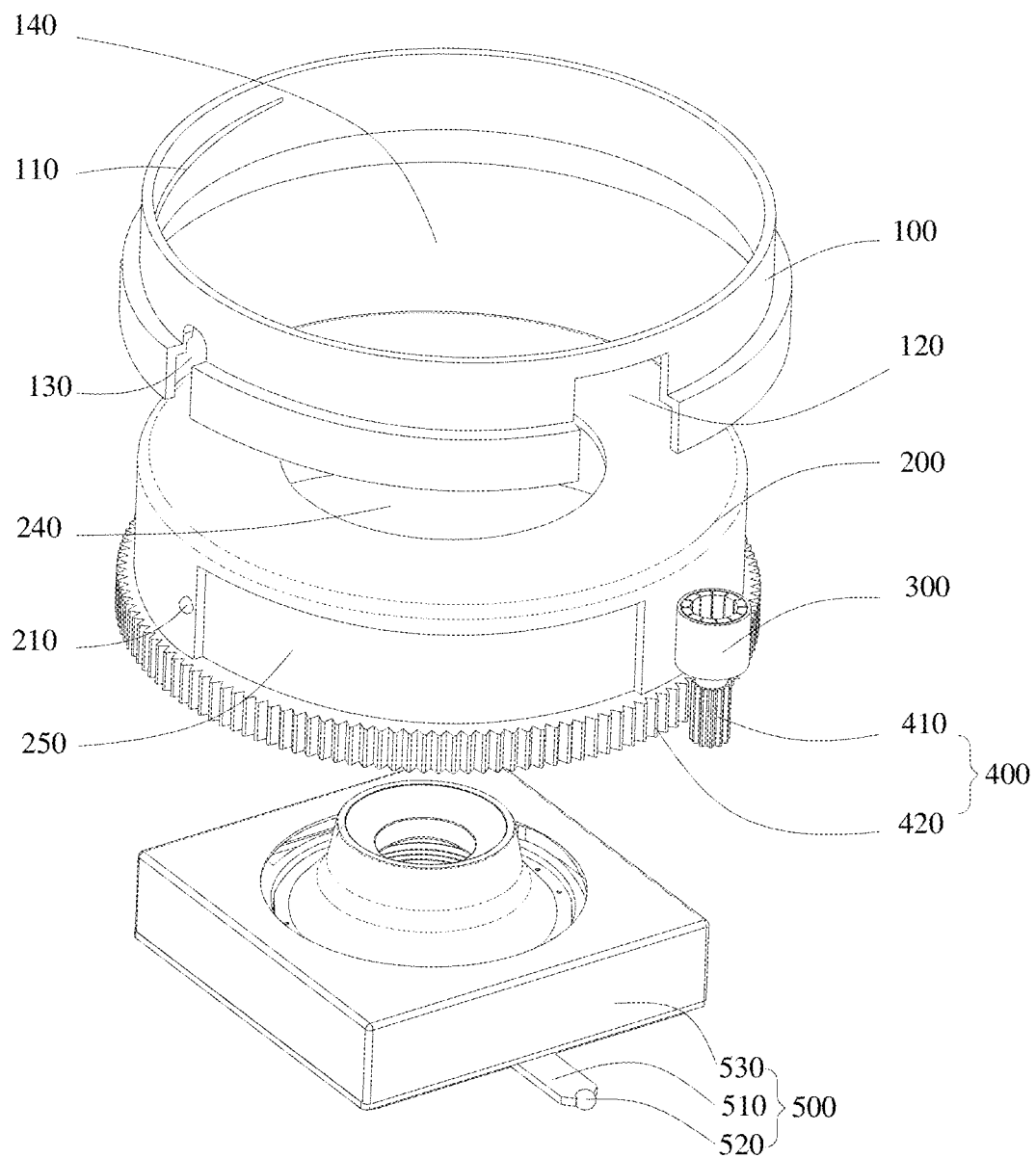
FIG. 2 is an exploded view of FIG. 1 according to an embodiment of the present application.
Figure 3:
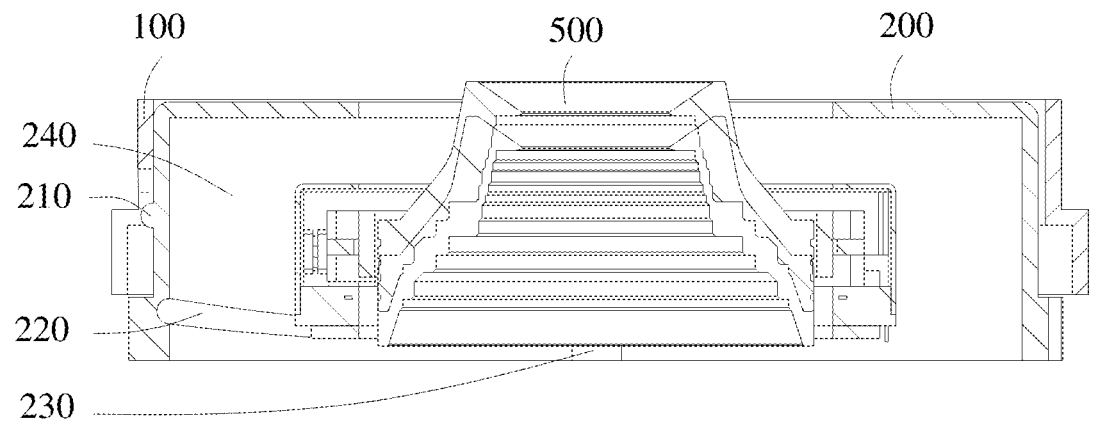
FIG. 3 is a diagram of an internal structure of a shooting apparatus in a first direction according to an embodiment of the present application.
Figure 4:
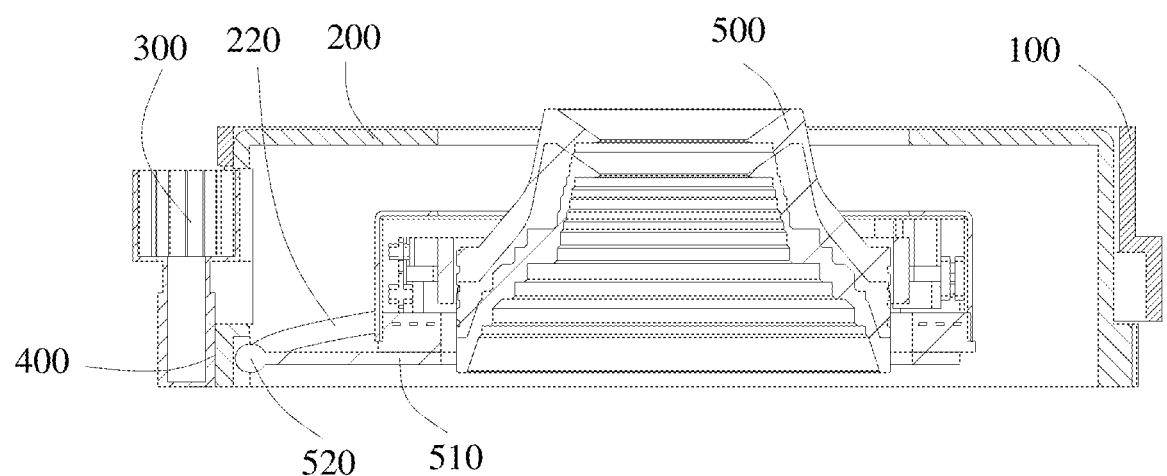
FIG. 4 is a diagram of an internal structure of a shooting apparatus in a second direction according to an embodiment of the present application.

Referring to FIGS. 1 to 4, this application discloses a shooting apparatus primarily used for electronic devices such as smartphones and computers, so as to achieve zoom shooting of the electronic devices. The shooting apparatus may include a first housing 100, a second housing 200, a drive mechanism 300, and a lens module 500.

The first housing 100 serves as the base housing of the shooting apparatus and is configured to mount other components in the shooting apparatus. The first housing 100 is typically fixed to the electronic device. Optionally, the first housing 100 may be provided with a first accommodating hole 140, and the second housing 200 may be movably disposed in the first accommodating hole 140. For example, both the first housing 100 and the second housing 200 are in a cylindrical shape, and the second housing 200 is in clearance fit with the first housing 100.

The lens module 500 is the core component of the shooting apparatus for imaging, such as a regular optical lens, an infrared lens, and a telephoto lens. The second housing 200 serves as the mounting base for the lens module 500 to isolate the lens module 500 from the first housing 100. Optionally, the second housing 200 may be provided with a second accommodating hole 240, and the lens module 500 may be disposed in the second accommodating hole 240.

The second housing 200 serves as the transfer component for drive force to transfer the drive force generated by the drive mechanism 300 to the lens module 500. In this way, the lens module 500 and the second housing 200 integrally form an extending and retracting structure. Such extending and retracting structure is extendable and retractable relative to the first housing 100, such that the lens module 500 extends and retracts relative to the first housing 100, thus implementing the focus shooting of the shooting apparatus.

Optionally, the drive mechanism 300 may be drivingly connected to the second housing 200, and one of the first housing 100 and the second housing 200 is provided with a first spiral groove 110 and the other of the first housing 100 and the second housing 200 is provided with a first protrusion 210. The first protrusion 210 is guidedly engaged with the first spiral groove 110. For example, the first spiral groove 110 is located on an outer periphery of the second housing 200, and the first protrusion 210 is disposed on an inner wall of the first accommodating hole 140.

The first protrusion 210 is slidable in the first spiral groove 110 via the drive mechanism 300. For example, when the drive mechanism 300 is started, it provides a drive force for the second housing 200 to drive the first protrusion 210 to move. The guide fit between the first protrusion 210 and the first spiral groove 110 constrains the movement path of the first protrusion 210, allowing it to slide in the first spiral groove 110. Under this constraint of the first protrusion 210 and the first spiral groove 110, the second housing 200 performs a spiral lifting motion, allowing at least a portion of the second housing 200 to be extendable out of or retractable into the first accommodating hole 140.

In this case, the lens module 500 is movable with the second housing 200, for example, to perform a spiral lifting motion with the second housing 200. This allows the lens module 500 to also extend out of or retract into the first housing 100.

One end of the first accommodating hole 140 for extension and retraction of the second housing 200 is a first aperture, and one end of the first accommodating hole 140 back away from the first aperture is a second aperture. The shooting apparatus may further include a base plate, where the base plate can seal the second aperture, and a photosensitive chip may be provided on a side of the base plate facing the lens module 500. The photosensitive chip can capture image information entering the lens module 500, thereby enabling the shooting of the shooting apparatus. The photosensitive chip and the lens module 500 may be sequentially arranged along the optical axis direction of the lens module 500. In this way, when the lens module 500 extends out of or retracts into the first housing 100, the distance between the lens module 500 and the photosensitive chip can be changed, allowing for zoom shooting.

In summary, the extendable and retractable arrangement of the first housing 100, the second housing 200, and the lens module 500 can not only achieve zoom of the lens module 500, but also switch the volume size of the shooting apparatus according to the shooting state, reducing the overall volume of the shooting apparatus. This contributes to the miniaturization and lightweight design of electronic devices equipped with the shooting apparatus.

The first accommodating hole 140 and the second accommodating hole 240 are coaxially arranged along their axis and are both coaxial with the optical axis of the lens module 500. This ensures that the movement of the lens module 500 does not deviate from the optical axis, and thus guarantees image quality.

In terms of the assembly relationship between the lens module 500 and the second housing 200, the lens module 500 can be fixed in the second housing 200 through interference fit or the like, so as to synchronously move with the second housing 200. That is, both the lens module 500 and the second housing 200 extend and retract relative to the first housing 100 in a spiral lifting motion. In this application, the lens module 500 can be movably disposed in the second accommodating hole 240, such that the first housing 100, the second housing 200, and the lens module 500 are all extendable and retractable, expanding the zoom range of the shooting apparatus.

Optionally, one of the second housing 200 and the lens module 500 is provided with a second spiral groove 220 and the other of the second housing 200 and the lens module 500 is provided with a second protrusion 520. For example, the second spiral groove 220 is disposed on an outer periphery of the lens module 500 and the second protrusion 520 is disposed on the wall of the second accommodating hole 240, the second protrusion 520 being guidedly engaged with the second spiral groove 220.

With this arrangement, the second protrusion 520 is slidable in the second spiral groove 220 via the drive mechanism 300. The following describes the relevant principle and objective:

As described above, when the drive mechanism 300 is started, the second housing 200 performs a spiral lifting motion relative to the first housing 100. For ease of description herein, the spiral lifting motion of the second housing 200 can be divided into the lifting motion in the optical axis and rotational motion around the optical axis.

In terms of the lifting motion of the second housing 200, the lens module 500 performs a lifting motion along with the second housing 200 through the guide fit between the second protrusion 520 and the second spiral groove 220.

In terms of the rotational motion of the second housing 200, when the second housing 200 rotates, the second protrusion 520 moves relative to the second spiral groove 220. As the second housing 200 rotates, the position of the second protrusion 520 in the second spiral groove 220 is changed. Under the drive of the second housing 200, the lens module 500 can perform a lifting motion relative to the second housing 200, allowing at least a portion of the lens module 500 to be extendable out of or retractable into the second accommodating hole 240.

In summary, under the drive of the drive mechanism 300, the second housing 200 is extendable and retractable relative to the first housing 100. In addition, the lens module 500 is also extendable and retractable relative to the second housing 200. When both the second housing 200 and the lens module 500 are in the extended state, the first housing 100, the second housing 200, and the lens module 500 are sequentially arranged along the optical axis direction of the lens module 500. This extension and retraction method expands the zoom range of the shooting apparatus.

In terms of the connection between the drive mechanism 300 and the second housing 200, the drive mechanism 300 can be directly connected to the second housing 200. For example, the drive mechanism 300 is disposed on the base plate and connected to the second housing 200 through hub-to-shaft connection or the like, so as to make the second housing 200 rotate. The shooting apparatus of this application may further include a transmission mechanism 400. The drive mechanism 300 can be driven by the transmission mechanism 400 to be connected to the second housing 200. The way that the second housing 200 is driven directly by the drive mechanism 300 can make the movement of the second housing 200 more stable.

In terms of the structure of the transmission mechanism 400, the transmission mechanism 400 may include a plurality of engaging teeth 420 and a rack. The drive mechanism 300 may be a piston mechanism. The rack is connected to the piston mechanism, and the plurality of engaging teeth 420 are arranged around the periphery of the second housing 200, the rack being engaged with the plurality of engaging teeth 420. When the piston mechanism drives the rack to move, the engagement between the rack and engaging teeth 420 drives the second housing 200 to perform lifting motion.

In this application, the transmission mechanism 400 may be provided with a gear shaft 410 and a plurality of engaging teeth 420. The drive mechanism 300 may be a motor. The plurality of engaging teeth 420 are arranged around the periphery of the second housing 200. The plurality of engaging teeth 420 may be of an open-loop structure or a closed-loop structure to form a teeth ring. In addition, the plurality of engaging teeth 420 and the second housing 200 may be formed integrally, or may be connected detachably or in another manner in the second housing 200. The gear shaft 410 is rotatably connected to the drive mechanism 300. For example, the hub-to-shaft connection between the gear shaft 410 and the motor shaft of the drive mechanism 300 is achieved directly via key connection, spline connection, or the like. Alternatively, the gear shaft 410 is connected to the motor shaft of the drive mechanism 300 using a coupling, a connection flange, or another structure. The gear shaft 410 is engaged with the plurality of engaging teeth 420. When rotating, the drive mechanism 300 drives the gear shaft 410 to rotate and to drive, through engagement, the second housing 200 to perform a spiral lifting motion.

It should be noted that, in this arrangement of this application, to ensure that the gear shaft 410 remains engaged with the plurality of engaging teeth 420 throughout the spiral lifting motion of the second housing 200, the tooth width of the gear shaft 410 can be greater than the tooth width of the engaging teeth 420. In terms of the tooth orientation of the gear shaft 410 and the engaging teeth 420, the gear shaft 410 may be a straight-toothed gear shaft to guide the engaging teeth 420, or may be a helical gear shaft to achieve smoother engagement.

In terms of the position of the transmission mechanism 400, the plurality of engaging teeth 420 may be located on the inner wall of the second accommodating hole 240. In this way, both the drive mechanism 300 and the gear shaft 410 are disposed in the second accommodating hole 240, which can improve the integration of the shooting apparatus. In this application, the plurality of engaging teeth 420 are disposed on the outer peripheral wall of the second housing 200, and a first mounting component 120 is disposed on the first housing 100. The drive mechanism 300 is fixed to the first mounting component 120. Such arrangement isolates the lens module 500 from the drive mechanism 300, preventing the drive mechanism 300, the transmission mechanism 400, and the like from bumping against the lens module 500 in the focusing process.

In terms of the structure of the first mounting component 120, the first mounting component 120 may be a mounting frame to which the drive mechanism 300 is fixed. In this application, the first mounting component 120 is arranged as a mounting groove or mounting opening, and the drive mechanism 300 is disposed in the mounting groove or mounting opening. This arrangement of the first mounting component 120 can improve the integration of the shooting apparatus and reduce the volume of the shooting apparatus.

Optionally, the second housing 200 may be provided with an avoidance notch 250. The drive mechanism 300 has a first portion located outside the first accommodating hole 140 and a second portion located inside the first accommodating hole 140. The first portion of the drive mechanism 300 is fixed to the first mounting component 120, and the second portion of the drive mechanism 300 is accommodated in the avoidance notch 250, which can reduce the volume of the shooting apparatus.

Optionally, the first protrusion 210 may be provided on the second housing 200, and the first spiral groove 110 may be provided in the first housing 100. The second protrusion 520 may be provided on the lens module 500, and the second spiral groove 220 may be provided in the second housing 200. The first protrusion 210 may be arranged as a sphere and movably embedded on the second housing 200, while the second protrusion 520 may also be arranged spherical and movably embedded on the lens module 500. This allows for smoother guide fit between the first protrusion 210 and the first spiral groove 110, as well as between the second protrusion 520 and the second spiral groove 220, preventing jamming. Certainly, the first protrusion 210 and the second protrusion 520 may alternatively be designed as a structure such as a slider.

In addition, the first housing 100 may be provided with a first loading or unloading space 130. The first loading or unloading space 130 may be a loading or unloading groove formed in the wall of the first accommodating hole 140. The loading or unloading groove is a trench structure formed in the inner wall of the first housing 100. The trench structure can enhance the overall strength of the first housing 100, making the first housing 100 less susceptible to deformation under stress. The first loading or unloading space 130 may be designed as a loading or unloading notch formed in the wall of the first accommodating hole 140. The loading or unloading notch is a recess structure formed in the first housing 100 and running along the radial direction of the first housing 100. Such the recess structure facilitates processing and manufacturing, so as to assemble related components.

The first loading or unloading space 130 has a first opening located at an end face of the first housing 100, the first loading or unloading space 130 communicates with the first spiral groove 110, the first protrusion 210 slidably coordinates with the first loading or unloading space 130, and the first protrusion 210 is slidable into or out of the first loading or unloading space 130 via the first opening, thus implementing the assembling and disassembling of the first housing 100 and the second housing 200.

The second housing 200 may be provided with a second loading or unloading space 230. The second loading or unloading space 230 is a loading or unloading groove or a loading or unloading notch formed in a wall of the second accommodating hole 240, the second loading or unloading space 230 communicates with the second spiral groove 220, the second protrusion 520 slidably coordinates with the second loading or unloading space 230, the second loading or unloading space 230 has a second opening located at an end face of the second housing 200, and the second protrusion 520 is slidable into or out of the second loading or unloading space 230 via the second opening, thus implementing the assembling and disassembling of the second housing 200 and the lens module 500.

In summary, such arrangement improves the convenience of disassembly and assembly between the first housing 100, the second housing 200, and the lens module 500.

It should be noted that to ensure stable movement, the first protrusion 210 may be provided in plurality and the plurality of first protrusions 210 are uniformly distributed around the periphery of the second housing 200. Similarly, the second protrusion 520 may be also provided in plurality and the plurality of second protrusions 520 are uniformly distributed around the periphery of the lens module 500. Certainly, the first loading or unloading space 130 and the second loading or unloading space 230 each should also be provided in plurality. The first loading or unloading spaces 130 are in one-to-one correspondence with the first protrusions 210, and the second protrusions 520 are in one-to-one correspondence with the second loading or unloading spaces 230.

For example, sealing blocks may be added to seal the first loading or unloading space 130 and the second loading or unloading space 230. After the first housing 100 and the second housing 200 are assembled, the first protrusion 210 slides into the first spiral groove 110. In this case, the sealing block is used to seal the first loading or unloading space 130, so as to prevent the first housing 100 from being separated from the second housing 200. Similarly, after the second housing 200 and the lens module 500 are assembled, the second protrusion 520 slides into the second spiral groove 220. In this case, a sealing block is used to seal the second loading or unloading space 230 so as to prevent the second housing 200 from being separated from the lens module 500.

Optionally, the lens module 500 may include a base 530 and an extending rod 510 that are interconnected. The second protrusion 520 is disposed at one end of the extending rod 510 back away from the base 530. Such arrangement can enhance the adaptability between the lens module 500 and the second housing 200. For example, in a case that the base 530 of the lens module 500 is rectangular and the second accommodating hole 240 is circular or there is a large gap between the base 530 of the lens module 500 and the second accommodating hole 240, the extending rod 510 can extend the second protrusion 520 outside the base 530, to ensure the effective fit between the second protrusion 520 and the second spiral groove 220.

The first spiral groove 110 may include an arc groove segment and a spiral groove segment that communicate with each other. The arc groove segment and the spiral groove segment are sequentially arranged in a direction leaving the second aperture. Such arrangement allows for sequential extension and retraction of the second housing 200 and the lens module 500. For example, during zoom shooting, the drive mechanism 300 is started. In addition, the first protrusion 210 enters the arc groove segment and slides in it. In such a case, the second housing 200 can rotate, around the optical axis. In addition, through the guide fit between the second protrusion 520 and the second spiral groove 220, the lens module 500 performs the lifting motion, thus extending by a first distance relative to the first housing 100.

As the drive mechanism 300 continues to operate, the first protrusion 210 enters the spiral groove segment and slides in it. In such a case, the second housing 200 can perform the spiral rising motion, and extends outside the first housing 100. In addition, through the guide fit between the second protrusion 520 and the second spiral groove 220, the lens module 500 continues to perform the lifting motion. Thus, during the stage where the first protrusion 210 slides in the spiral groove segment, the lens module 500 continuously extends by a second distance relative to the first housing 100.

In summary, such arrangement allows the lens module 500 to extend out of the first housing 100 and then the second housing 200 to extend out of the first housing 100. This sequential extension method enhances the control over the zoom shooting of the shooting apparatus.

To ensure that when extending and retracting, the lens module 500 only performs the lifting motion and does not rotate along with the spiral rising motion of the second housing 200, and the lens module 500 can be provided with a guide mechanism to constrain the movement of the lens module 500.

The base 530 of the lens module 500 may include a housing component and a main body portion. The main body portion is a portion for imaging by the lens module 500. For example, a lens, a motor, and the like are all disposed on the main body portion. The housing component covers the main body portion for protection.

In terms of the structure of the housing component, the housing component can include a base housing and a movable housing. The movable housing is movably disposed on the base housing and guidedly engaged with the base housing. The movable housing can perform a lifting motion along the optical axis relative to the base housing, and the main body portion is disposed in the movable housing. The second protrusion 520 is disposed on the movable housing and moves along with it. Such arrangement enables the lens module 500 to have extending and retracting capabilities.

In this way, when the drive mechanism 300 is started, the second housing 200 transfers the drive force to the lens module 500. The guide fit between the second protrusion 520 and the second spiral groove 220 and the mutual constraint between the movable housing and the base housing can drive the movable housing to perform the lifting motion along the optical axis. This prevents the movable housing from rotating during the movement, allowing for controlling over focusing and shooting of the lens module 500.

The base housing can be fixed to a base plate and surround the photosensitive chip, optimizing the structure of the shooting apparatus.

The electronic device disclosed in the embodiments of this application may be a smartphone, a tablet computer, an e-book reader, a wearable device (for example, a smart watch and smart glasses), and the like. A type of the electronic device is not limited in the embodiments of this application.

The foregoing descriptions are merely embodiments of this application and are not intended to limit this application. For persons skilled in the art, this application may have various changes and variations. Any modification, equivalent replacement, improvement, or the like made without departing from the spirit and principle of this application shall fall within the scope of claims of this application.

What is claimed is:

1. A shooting apparatus, comprising a first housing, a second housing, a drive mechanism, and a lens module, wherein
the first housing is provided with a first accommodating hole, the second housing is movably disposed in the first accommodating hole, and the drive mechanism is drivingly connected to the second housing;

the second housing is provided with a second accommodating hole, and the lens module is disposed in the second accommodating hole;

one of the first housing and the second housing is provided with a first spiral groove and another of the first housing and the second housing is provided with a first protrusion, and the first protrusion is guidedly engaged with the first spiral groove; and the first protrusion is slidable in the first spiral groove via the drive mechanism, the second housing is capable of performing a spiral lifting motion, at least a portion of the second housing is extendable out of or retractable into the first accommodating hole, and the lens module is movable with the second housing; wherein the lens module is movably disposed in the second accommodating hole, one of the second housing and the lens module is provided with a second spiral groove and another of the second housing and the lens module is provided with a second protrusion, and the second protrusion is guidedly engaged with the second spiral groove;

the second protrusion is slidable in the second spiral groove via the drive mechanism, the lens module is capable of performing a lifting motion, and at least a portion of the lens module is extendable out of or retractable into the second accommodating hole;

the first protrusion is disposed in the second housing, and the first spiral groove is disposed in the first housing; and the first housing is provided with a first loading or unloading space, the first loading or unloading space has a first opening located at an end face of the first housing, the first loading or unloading space communicates with the first spiral groove, the first protrusion slidably coordinates with the first loading or unloading space, and the first protrusion is slidable into or out of the first loading or unloading space via the first opening.

2. The shooting apparatus according to claim 1, wherein the shooting apparatus further comprises a transmission mechanism, and the drive mechanism is drivingly connected to the second housing via the transmission mechanism.

3. The shooting apparatus according to claim 2, wherein the transmission mechanism comprises a gear shaft and a plurality of engaging teeth, and the drive mechanism is a motor, wherein the plurality of engaging teeth are arranged around a peripheral portion of the second housing, the gear shaft is rotatably connected to the drive mechanism, and the gear shaft is engaged with the plurality of engaging teeth.

4. The shooting apparatus according to claim 3, wherein the plurality of engaging teeth are located on a peripheral wall of the second housing, a first mounting component is disposed on the first housing, and the drive mechanism is fixedly mounted on the first mounting component.

5. The shooting apparatus according to claim 4, wherein the second housing is provided with an avoidance notch, and the drive mechanism has a first portion located outside the first accommodating hole and a second portion located inside the first accommodating hole, wherein the first portion of the drive mechanism is fixed to the first mounting component, and the second portion of the drive mechanism is accommodated in the avoidance notch.

6. The shooting apparatus according to claim 1, wherein the second protrusion is disposed in the lens module, and the second spiral groove is disposed in the second housing, wherein the second housing is provided with a second loading or unloading space, the second loading or unloading space is a loading or unloading groove or a loading or unloading notch formed in a wall of the second accommodating hole, the second loading or unloading space communicates with the second spiral groove, the second protrusion slidably coordinates with the second loading or unloading space, the second loading or unloading space has a second opening located at an end face of the second housing, and the second protrusion is slidable into or out of the second loading or unloading space via the second opening.

7. The shooting apparatus according to claim 6, wherein the lens module comprises a base and an extending rod that are interconnected, and the second protrusion is disposed at one end of the extending rod back away from the base.

8. An electronic device, comprising a shooting apparatus, wherein the shooting apparatus comprises a first housing, a second housing, a drive mechanism, and a lens module, wherein the first housing is provided with a first accommodating hole, the second housing is movably disposed in the first accommodating hole, and the drive mechanism is drivingly connected to the second housing;

the second housing is provided with a second accommodating hole, and the lens module is disposed in the second accommodating hole;

one of the first housing and the second housing is provided with a first spiral groove and another of the first housing and the second housing is provided with a first protrusion, and the first protrusion is guidedly engaged with the first spiral groove; and the first protrusion is slidable in the first spiral groove via the drive mechanism, the second housing is capable of performing a spiral lifting motion, at least a portion of the second housing is extendable out of or retractable into the first accommodating hole, and the lens module is movable with the second housing; wherein the lens module is movably disposed in the second accommodating hole, one of the second housing and the lens module is provided with a second spiral groove and another of the second housing and the lens module is provided with a second protrusion, and the second protrusion is guidedly engaged with the second spiral groove;

the second protrusion is slidable in the second spiral groove via the drive mechanism, the lens module is capable of performing a lifting motion, and at least a portion of the lens module is extendable out of or retractable into the second accommodating hole;

the first protrusion is disposed in the second housing, and the first spiral groove is disposed in the first housing; and the first housing is provided with a first loading or unloading space, the first loading or unloading space has a first opening located at an end face of the first housing, the first loading or unloading space communicates with the first spiral groove, the first protrusion slidably coordinates with the first loading or unloading space, and the first protrusion is slidable into or out of the first loading or unloading space via the first opening.

9. The electronic device according to claim 8, wherein the shooting apparatus further comprises a transmission mechanism, and the drive mechanism is drivingly connected to the second housing via the transmission mechanism.

10. The electronic device according to claim 9, wherein the transmission mechanism comprises a gear shaft and a plurality of engaging teeth, and the drive mechanism is a motor, wherein
the plurality of engaging teeth are arranged around a peripheral portion of the second housing, the gear shaft is rotatably connected to the drive mechanism, and the gear shaft is engaged with the plurality of engaging teeth.

11. The electronic device according to claim 10, wherein the plurality of engaging teeth are located on a peripheral wall of the second housing, a first mounting component is disposed on the first housing, and the drive mechanism is fixedly mounted on the first mounting component.

12. The electronic device according to claim 11, wherein the second housing is provided with an avoidance notch, and
the drive mechanism has a first portion located outside the first accommodating hole and a second portion located inside the first accommodating hole, wherein the first portion of the drive mechanism is fixed to the first mounting component, and the second portion of the drive mechanism is accommodated in the avoidance notch.

13. The electronic device according to claim 8, wherein the second protrusion is disposed in the lens module, and the second spiral groove is disposed in the second housing, wherein
the second housing is provided with a second loading or unloading space, the second loading or unloading space is a loading or unloading groove or a loading or unloading notch formed in a wall of the second accommodating hole, the second loading or unloading space communicates with the second spiral groove, the second protrusion slidably coordinates with the second loading or unloading space, the second loading or unloading space has a second opening located at an end face of the second housing, and the second protrusion is slidable into or out of the second loading or unloading space via the second opening.

14. The electronic device according to claim 13, wherein the lens module comprises a base and an extending rod that are interconnected, and the second protrusion is disposed at one end of the extending rod back away from the base.

* * * * *